No. 788,454. Patented April 25, 1905.

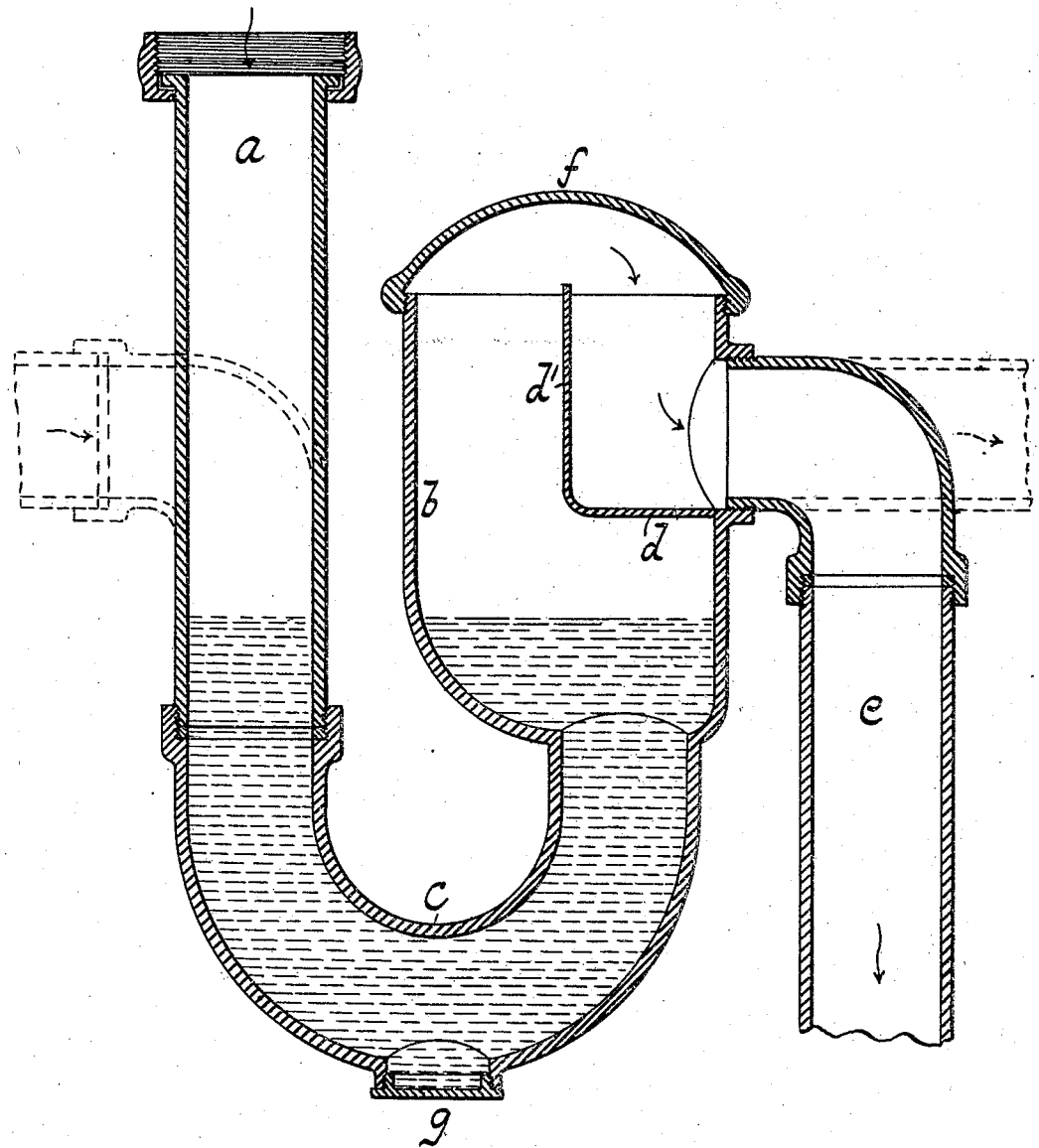

UNITED STATES PATENT OFFICE.

GEORGE CODY, OF NEW YORK, N. Y., ASSIGNOR TO LOUIS MUNZINGER, OF NEW YORK, N. Y.

NON-SIPHONABLE SELF-SCOURING TRAP.

SPECIFICATION forming part of Letters Patent No. 788,454, dated April 25, 1905.

Application filed March 26, 1904. Serial No. 200,206.

*To all whom it may concern:*

Be it known that I, GEORGE CODY, a citizen of the United States, residing at New York city, in the county and State of New York, have invented new and useful Improvements in Non-Siphonable Self-Scouring Traps, of which the following is a specification.

This trap, which is non-siphonable self-scouring, is adapted for plumbing-fixtures, sewers, drains, leaders of buildings, and the like.

The trap can be made to assume various forms—as, for example, that of a full S-trap or a half S-trap or running trap—and provided with side or lateral outlet.

This invention is set forth in the following specification and claims and illustrated in the annexed drawing, which shows a sectional elevation of a trap embodying this invention.

In the drawing is shown a waste or inlet pipe $a$, leading to the chamber or enlarged outer leg $b$ of the trap. A curved or oval bend or pipe $c$ leads from the inlet into the chamber. This bend or curve is of suitable depth to provide an efficient seal or prevent breakage of the seal or siphoning out. This inlet, as seen, enters the chamber at one side of its axis or center. A shelf $d$ is shown above or overhanging the inlet-mouth leading into the chamber. The shelf or baffle $d$ projects from under or level, with the outlet $e$ of the chamber across toward the center thereof and also upward a suitable distance in form of a partition $d'$. The waste or flow from pipe $a$ enters the enlarged outer leg or chamber through the bend or curve and flows freely or without impediment over partition $d'$ and off over shelf $d$ and outlet $e$. The water remaining in the chamber will form a seal. The trap is non-siphonable, because during siphonic action the shelf or wall will baffle or prevent the siphonage by holding the fluid contents in agitation until the air is drawn or forced through from the inlet end of the trap and which air breaks the siphon. When the air has passed through and the siphon broken, the contents or fluid settle to the bottom or bend of the trap and make a permanent seal which cannot be broken or impaired by further siphonic action. A trap thus constructed has been found to be self-scouring, as during the passage of fluid matter the same is in contact with the entire interior of the trap, so as to wash or scour the same. The shelf, which is at or level with the outlet portion, as also the interior of the chamber, can be reached by opening or removing the top or cap $f$. A trap clean-out can also be applied as seen at $g$.

The various arrangements or directions of pipes for full S or half S or running trap are indicated by full and dotted lines, respectively. After siphonic action the water in the trap has been found to stand about as indicated by broken lines.

What I claim as my invention, and desire to secure by Letters Patent, is—

1. A trap comprising an inlet and outlet, a shelf level with the outlet, and a baffle made to rise above the outlet to prevent siphonage, said shelf being extended across about one-half the body of the trap to overhang the inlet and the rest of the trap being left clear or unobstructed.

2. A trap having an inlet with an enlarged outer leg or chamber and an outlet, said inlet being made to enter the chamber through the bottom at one side thereof, and a shelf made to project at the outlet across the chamber over such inlet and extended upward therein.

3. A trap comprising a chamber having an inlet and an outlet, a lateral extending shelf arranged above and over the inlet at the outlet side of the chamber to prevent siphonage, said shelf provided with a vertically-extending projection arranged substantially centrally of said chamber at the front of the outlet and terminating at a point removed from the top wall of the chamber.

4. A trap comprising a chamber having an inlet and an outlet, and a siphonage-preventing member substantially L-shaped in cross-section, arranged in said chamber and positioned above and over the inlet and at the front of the outlet.

5. A trap comprising a chamber having an inlet and an outlet, and a laterally-extending shelf at one side of the chamber and arranged between the inlet and the outlet, said shelf adapted to prevent siphonage.

6. A trap comprising a chamber having an inlet and an outlet, spaced from and placed at an angle with respect to one another, and a laterally-extending shelf between the inlet and the outlet, said shelf on a level with the outlet.

7. A trap comprising a chamber having an inlet and an outlet, and an antisiphon-baffle projecting from and extending above said outlet.

8. A trap comprising a chamber having an inlet in one side of the bottom thereof and an outlet in one side of said chamber, and an antisiphon-baffle arranged over the inlet and projecting from and extending above said outlet.

In testimony whereof I have hereunto set my hand in the presence of two subscribing witnesses.

GEORGE CODY.

Witnesses:
CHAS. E. POENSGEN,
GEORGE HULSBERG.